United States Patent
Oba

(10) Patent No.: US 10,205,229 B2
(45) Date of Patent: Feb. 12, 2019

(54) WAVE ENERGY RADIATING APPARATUS

(71) Applicant: Mitsubishi Electric Corporation, Tokyo (JP)

(72) Inventor: Tetsuya Oba, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 356 days.

(21) Appl. No.: 15/133,769

(22) Filed: Apr. 20, 2016

(65) Prior Publication Data
US 2017/0162935 A1    Jun. 8, 2017

(30) Foreign Application Priority Data

Dec. 4, 2015   (JP) .................................. 2015-237480

(51) Int. Cl.
| | | |
|---|---|---|
| *G01S 7/40* | (2006.01) | |
| *H01Q 1/32* | (2006.01) | |
| *H01Q 3/12* | (2006.01) | |
| *G01S 13/93* | (2006.01) | |

(52) U.S. Cl.
CPC .......... *H01Q 1/325* (2013.01); *G01S 7/4026* (2013.01); *G01S 13/931* (2013.01); *H01Q 3/12* (2013.01)

(58) Field of Classification Search
CPC .... H01Q 1/1235; H01Q 1/125; H01Q 1/1264; H01Q 3/00; H01Q 3/02; H01Q 3/12; H01Q 3/04; H01Q 3/06; G01S 13/931; G05G 11/00
See application file for complete search history.

(56) References Cited

U.S. PATENT DOCUMENTS

| | | | | | |
|---|---|---|---|---|---|
| 3,889,551 | A | * | 6/1975 | Harmening .............. | F16F 15/28 343/763 |
| 4,006,645 | A | * | 2/1977 | Newell .................... | B23Q 1/36 74/490.08 |
| 4,799,064 | A | * | 1/1989 | Nakamura ............. | H01Q 1/125 343/761 |
| 5,075,682 | A | * | 12/1991 | Dehnert ............... | H01Q 1/1257 342/352 |

(Continued)

FOREIGN PATENT DOCUMENTS

| | | | | |
|---|---|---|---|---|
| JP | 2000-165130 A | | 6/2000 | |
| JP | 2004047852 A | * | 2/2004 | ............. G02B 21/00 |

*Primary Examiner* — Peter M Bythrow
(74) *Attorney, Agent, or Firm* — Sughrue Mion, PLLC; Richard C. Turner

(57) ABSTRACT

Provided is a wave energy radiating apparatus capable of downsizing with a simple structure. The wave energy radiating apparatus includes a radiation-direction changing and maintaining unit including a linear-movement generator (8, 10) where wave energy is radiated, and is configured to generate power required to change a direction of radiation of the wave energy radiating unit (2) linearly along the wave energy radiating unit (2), a direction changer (13) configured to change a direction of the power generated by the linear-movement generator (8, 10) toward the wave energy radiating unit (2) to turn the wave energy radiating unit (2), and a force applying member (9) configured to apply a force to the wave energy radiating unit (2) in a direction against the turning of the wave energy radiating unit (2), which is caused by the power.

8 Claims, 4 Drawing Sheets

(56) References Cited

U.S. PATENT DOCUMENTS

| | | | |
|---|---|---|---|
| 5,379,048 A * | 1/1995 | Kaufman | H01Q 3/02 248/183.1 |
| 5,619,215 A * | 4/1997 | Sydor | H01Q 3/08 343/765 |
| 6,204,823 B1 * | 3/2001 | Spano | H01Q 1/125 343/705 |
| 6,259,415 B1 * | 7/2001 | Kumpfbeck | H01Q 3/08 343/765 |
| 6,473,052 B1 * | 10/2002 | Schmid | H01Q 1/288 343/765 |
| 6,911,747 B2 * | 6/2005 | Tsuboi | B23Q 1/621 310/12.05 |
| 7,015,871 B2 * | 3/2006 | Gottl | H01Q 1/246 343/757 |
| 7,230,581 B2 * | 6/2007 | McEwan | H01Q 1/325 343/711 |
| 7,256,748 B2 * | 8/2007 | Tietjen | H01Q 3/08 343/763 |
| 7,427,962 B2 * | 9/2008 | Yang | H01Q 1/246 343/757 |
| 7,760,153 B2 * | 7/2010 | Bulow | H01Q 1/084 343/757 |
| 8,330,668 B2 * | 12/2012 | Deng | H01Q 1/246 343/754 |
| 8,423,201 B2 * | 4/2013 | Burdette | H01Q 3/04 343/766 |
| 8,890,756 B2 * | 11/2014 | Tsai | H01Q 3/02 343/757 |
| 9,263,797 B1 * | 2/2016 | Hall | H01Q 3/02 |
| 9,660,323 B2 * | 5/2017 | Au | H01Q 1/1264 |
| 2001/0046258 A1 * | 11/2001 | Wise | H01Q 1/084 375/219 |
| 2002/0140620 A1 * | 10/2002 | Yamauchi | H01Q 3/02 343/882 |
| 2004/0066335 A1 * | 4/2004 | Ashjaee | H01Q 1/38 343/700 MS |
| 2005/0057427 A1 * | 3/2005 | Wensink | H01Q 1/125 343/878 |
| 2005/0134512 A1 * | 6/2005 | Gottl | H01Q 1/246 343/757 |
| 2006/0244669 A1 * | 11/2006 | Mansour | H01Q 3/04 343/757 |
| 2007/0008230 A1 * | 1/2007 | Osaka | H01Q 1/44 343/702 |
| 2007/0205338 A1 * | 9/2007 | Sabatino | H01Q 1/081 248/125.7 |
| 2007/0216892 A1 * | 9/2007 | Eidelberg | G03B 27/58 355/72 |
| 2008/0229860 A1 * | 9/2008 | Bonev | B25J 9/106 74/479.01 |
| 2008/0278386 A1 * | 11/2008 | Hall | G01S 7/4026 343/703 |
| 2009/0135074 A1 * | 5/2009 | Yang | H01Q 1/246 343/766 |
| 2010/0201590 A1 * | 8/2010 | Girard | H01Q 1/246 343/766 |
| 2013/0169495 A1 * | 7/2013 | Tsai | H01Q 3/02 343/757 |
| 2017/0077585 A1 * | 3/2017 | Oxford | H01Q 1/125 |
| 2017/0315210 A1 * | 11/2017 | Oba | H01Q 1/38 |
| 2018/0013200 A1 * | 1/2018 | Clifford | H01Q 3/005 |

* cited by examiner

WAVE ENERGY RADIATING APPARATUS

BACKGROUND OF THE INVENTION

1. Field of the Invention

The present invention relates to a wave energy radiating apparatus configured to adjust, for example, an angle of a direction of radiation from a high-frequency antenna board.

2. Description of the Related Art

Hitherto, there has been known a radar antenna swinging apparatus including a link mechanism that is provided so that a swinging core of a radar antenna and a motor shaft are away from each other. In the radar antenna swinging apparatus, while a motor is making one turn, the antenna moves for one swing cycle (see, for example, Japanese Patent Application Laid-open No. 2000-165130).

However, the radar antenna swinging apparatus described above uses the link mechanism to adjust an angle of the antenna, and therefore has problems in a large number of components, a complex structure, and an increased apparatus size.

SUMMARY OF THE INVENTION

The present invention has been made to solve the problems described above, and provides a wave energy radiating apparatus capable of reducing the number of components, simplifying a structure, and reducing an apparatus size.

According to one embodiment of the present invention, there is provided a wave energy radiating apparatus, including:

wave energy radiating means for radiating wave energy into a space; and radiation-direction changing and maintaining means for turning the wave energy radiating means to change a direction of radiation of the wave energy radiating means, and for maintaining the changed direction of radiation of the wave energy radiating means, the radiation-direction changing and maintaining means including:

- a linear-movement generator that is provided on a surface of the wave energy radiating means opposite to a surface of the wave energy radiating means from which the wave energy is radiated, and is configured to generate power required to change an attitude of the wave energy radiating means linearly along the wave energy radiating means;
- a direction changer that is provided so as to face the linear-movement generator, and is configured to change a direction of the power generated by the linear-movement generator toward the wave energy radiating means to turn the wave energy radiating means; and
- a force applying member configured to apply a force to the wave energy radiating means in a direction against the turning of the wave energy radiating means, which is caused by the power.

According to the wave energy radiating apparatus of the one embodiment of the present invention, the linear-movement generator is configured to generate the power required to change the direction of radiation from the wave energy radiating means linearly along the wave energy radiating means. Thus, the apparatus can be reduced in size.

Further, the direction changer is configured to change the direction of the power generated by the linear-movement generator toward the wave energy radiating means. Thus, the angle of the wave energy radiating means can be driven with high resolution.

A load of the force applying member is transmitted to the linear-movement generator via the direction changer. Thus, a load on the linear-movement generator is reduced.

DETAILED DESCRIPTION OF THE PREFERRED EMBODIMENTS

Figure 1:
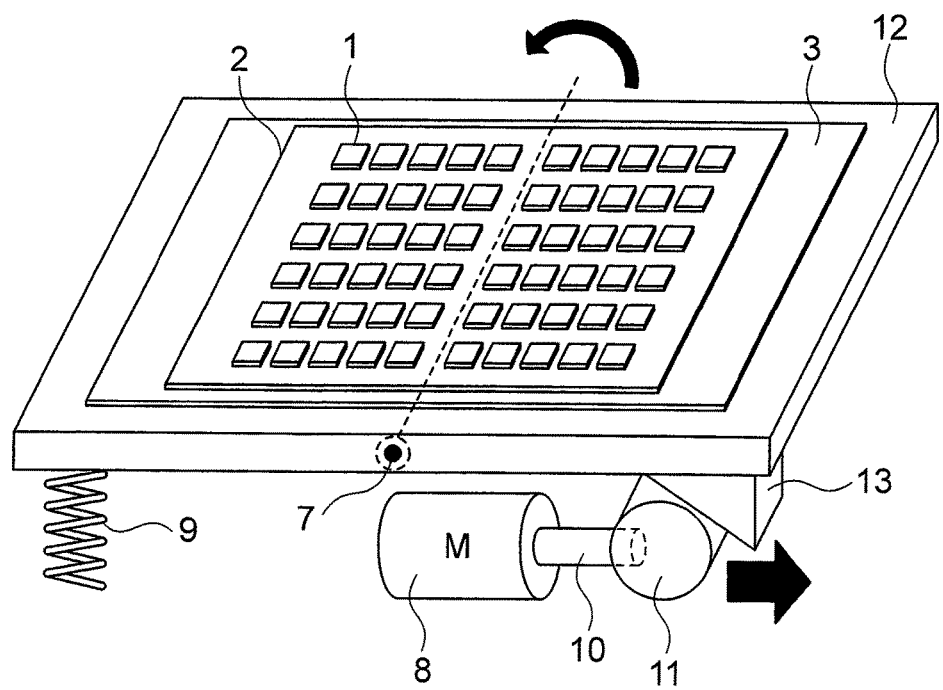
FIG. 1 is a perspective view of a main part of an in-vehicle radio-wave radar apparatus corresponding to a wave energy radiating apparatus according to Embodiment 1 of the present invention.

A description is now given of an in-vehicle radio-wave radar apparatus according to each embodiment of the present invention referring to the accompanying drawings, and throughout the drawings, like or corresponding members and parts are denoted by like reference numerals to describe those components.

Embodiment 1

Figure 2:
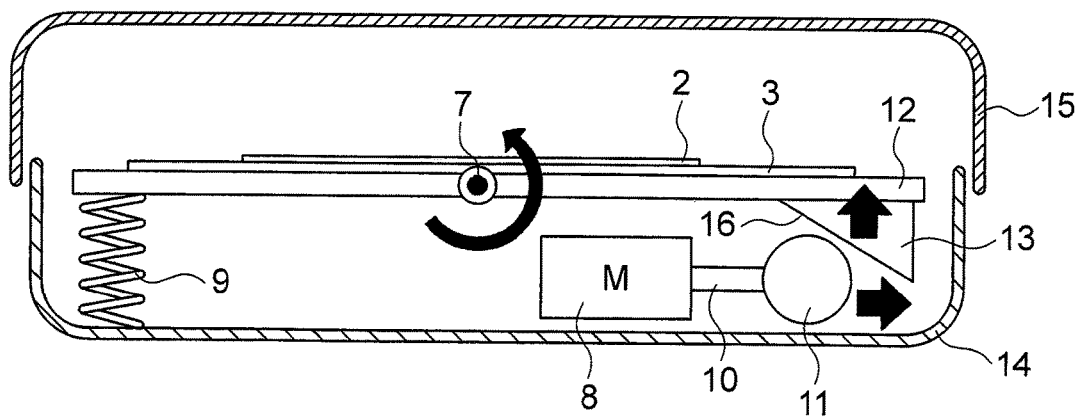
FIG. 2 is a side sectional view of FIG. 1.

FIG. 1 is a perspective view of a main part of an in-vehicle radio-wave radar apparatus corresponding to a wave energy radiating apparatus according to Embodiment 1 of the present invention, and FIG. 2 is a side sectional view of FIG. 1.

For the radio-wave radar apparatus, when a detection area for a target object is intended to be expanded, a radio-wave radiation pattern is required to be narrowed to form a sharper beam by increasing an aperture diameter of an antenna configured to radiate a radio wave so that enhancement of sensitivity of the antenna is achieved.

For the in-vehicle radio-wave radar apparatus, in particular, an antenna gain in a downward direction in which a road surface is present is required to be suppressed so as not to detect a reflected wave from the road surface or the like, which may become an obstacle to detect a target such as a vehicle running ahead or a pedestrian. At the same time, a high antenna gain in a front direction in which the target to be originally detected is present is required to be ensured. Therefore, it is common to provide sharp radiation directivity in a perpendicular plane so as to realize the suppression of the antenna gain in the downward direction and the high antenna gain in the front direction.

Therefore, in the in-vehicle radio-wave radar apparatus that requires high detection reliability, a maximum radiation direction of the radio wave, specifically, a so-called beam direction, is required to be constantly oriented in a direction in which the target (such as a vehicle running ahead or a pedestrian) to be detected is present. Thus, there is a need for a correcting function, that is, an axis adjustment mechanism configured to direct the maximum radiation direction of the radio wave to the front direction corresponding to a desired beam direction, not only when an error is generated at the time of mounting of the radar but also when an error is generated due to a shock applied on a vehicle body after the mounting of the radar.

The in-vehicle radio-wave radar apparatus according to Embodiment 1 includes an antenna 1. The antenna 1 is formed on a board surface layer of a high-frequency antenna board 2 that is wave energy radiating means by using etching or the like. The high-frequency antenna board 2 is bonded onto a common printed board 3 on which electronic circuits are mounted. The printed board 3 onto which the high-frequency antenna board 2 is bonded is fixed to a board case 12 having a rectangular shape. The board case 12 is configured to hold and accommodate the printed board 3 and to change and drive an angle of the printed board 3.

The antenna 1, which is a radio-wave radiating source, includes a plurality of antenna elements arranged in an array pattern on the board surface layer of the high-frequency antenna board 2. Each of the antenna elements is electrically excited, thereby radiating a radio wave into a space.

Thus, a maximum radiation direction, that is, a beam direction of the radio wave radiated from the antenna 1 approximately matches board normal directions of both the high-frequency antenna board 2 and the printed board 3.

As a method of fixing the printed board 3 to the board case 12 that is accommodated in a space formed between a radar apparatus casing 14 and a front resin cover 15, screw clamping is common. However, the printed board 3 may be bonded to the board case 2 by using an adhesive, and therefore fixing means is not limited to that described above.

The in-vehicle radio-wave radar apparatus according to Embodiment 1 has the maximum radiation direction, that is, the beam direction of the radio wave radiated from the antenna 1 that approximately matches the board normal directions of both the high-frequency antenna board 2 and the printed board 3. Thus, an axis deviation occurs in the beam direction of the radio wave under the effects of a bonding error of the high-frequency antenna board 2 to the printed board 3, an assembly error of the printed board 3 to the board case 12, a mounting error of the radio-wave radar apparatus in an automobile, or the like.

As means for eliminating the generated axis deviation described above, a bracket mechanism itself, which is configured to mount the in-vehicle radio-wave radar apparatus to a vehicle, can include an axis adjustment mechanism. In this case, however, a worker is required to directly touch a mounting bracket for the radar to make adjustment by using an adjustment tool after the radar is mounted in the vehicle.

For the reason described above, a location at which the radar can be mounted in the vehicle is limited. In addition, a large number of mounting steps including the adjustment by the worker are required. Thus, mounting costs disadvantageously increase.

Therefore, in the in-vehicle radio-wave radar apparatus according to Embodiment 1, the axis adjustment mechanism is included in the radio-wave radar apparatus, which is capable of adjusting the axis easily after the mounting of the radar in the vehicle so as to keep low mounting costs including those for the axis adjustment.

The in-vehicle radio-wave radar apparatus according to Embodiment 1 includes, as the axis adjustment mechanism, radiation-direction changing and maintaining means for turning the high-frequency antenna board 2 to change the direction of radiation from the high-frequency antenna board 2, and for maintaining a changed attitude of the high-frequency antenna board 2.

The radiation-direction changing and maintaining means includes a linear-movement generator, a direction changer, and a compression spring 9. The linear-movement generator is provided on a surface of the high-frequency antenna board 2 opposite to a surface thereof from which wave energy is radiated, and is configured to generate power required to change the attitude of the high-frequency antenna board 2 linearly along the high-frequency antenna board 2. The direction changer is provided so as to face the linear-movement generator, and is configured to change a direction of the power generated by the linear-movement generator toward the high-frequency antenna board 2 to turn the high-frequency antenna board 2. The compression spring 9 is a force applying member configured to apply a force to the high-frequency antenna board 2 in a direction against the turning of the high-frequency antenna board 2, which is caused by the power.

The linear-movement generator includes a stepping motor 8, a shaft 10, and a columnar body 11. The shaft 10 is configured to move linearly in a reciprocating manner via a mechanism configured to convert turning movement of a rotor of the stepping motor 8 into linear movement. The columnar body 11 having a columnar shape is a movable portion provided to a distal end portion of the shaft 10.

The direction changer is a protruding portion 13 provided to one end portion of the board case 12. The protruding portion 13 is a direction changing portion configured to change a direction of the power transmitted via the columnar body 11 through the shaft 10 to a direction for turning the board case 12 about turning center portions 7 of the board case 12 as a center. The protruding portion 13 has a slope 16 facing the columnar body 11.

Although not illustrated in FIG. 1 and FIG. 2 because only a conceptual description is given herein, the turning center portions 7 may be formed by forming a hole portion in the radar apparatus casing 14 so as to be integral therewith and forming a hole portion in the board case 12 so that the hole portions are opposed to each other, and inserting the same pin member into both of the hole portions. Alternatively, the turning center portions 7 may be formed by placing the board case 12 on a protruding portion formed on a surface of the radar apparatus casing 14.

Thus, the turning center portions 7 are provided to a set of opposite sides of the board case 12. An attitude of the board case 12 and even an attitude of the high-frequency antenna board 2 are angularly displaced about a line (indicated by the broken line in FIG. 1) that connects both the turning center portions 7 as a turning axis.

Further, the board case 12 is fixed to or is in contact with the radar apparatus casing 14 via the turning center portions 7. The stepping motor 8 is fixed to the radar apparatus casing 14 by using a bracket mechanism or the like.

In the above-mentioned in-vehicle radio-wave radar apparatus, motor power output from the stepping motor 8 through the shaft 10 is input to the protruding portion 13 provided to the board case 12 via the columnar body 11 to cause the board case 12 to be turned.

On the other hand, on the side of the board case 12, which is opposite to the side where the protruding portion 13 is formed across the turning center portions 7, the compression spring 9 is arranged as described above. A reaction force of a spring load of the compression spring 9 is input to the board case 12 so as to cause the board case 12 to be turned in a direction opposite to the motor power.

As a result, the above-mentioned two loads that are input to the board case 12 respectively cause the board case 12 to be turned in the directions opposite to each other. The amounts of the two loads are in equilibrium, and therefore the board case 12 can maintain an attitude state and an angle in the turning direction after the axis adjustment.

Further, the columnar body 11 is pushed out in a thrust direction of the shaft 10 by the motor power output from the stepping motor 8 through the shaft 10. As a result, the columnar body 11 pushes the protruding portion 13 of the board case 12 via the slope 16. A load applied from the columnar body 11 to the board case 12 is converted by the slope 16 into a load vector that causes the board case 12 to be turned.

Therefore, in the in-vehicle radio-wave radar apparatus of this embodiment, the stepping motor 8 is arranged in parallel to the board case 12, that is, the stepping motor 8 is arranged in a direction that does not allow the stepping motor 8 to directly turn the board case 12, as illustrated in FIG. 2. As described above, however, the motor power is converted by the slope 16 of the protruding portion 13 into the load in the direction that allows the board case 12 to be turned. As a result, the attitude of the board case 12 can be displaced.

Therefore, the attitude of the board case 12 can be displaced while the stepping motor 8 is installed in parallel to the board case 12. Thus, the product can be reduced in size.

Figure 3:
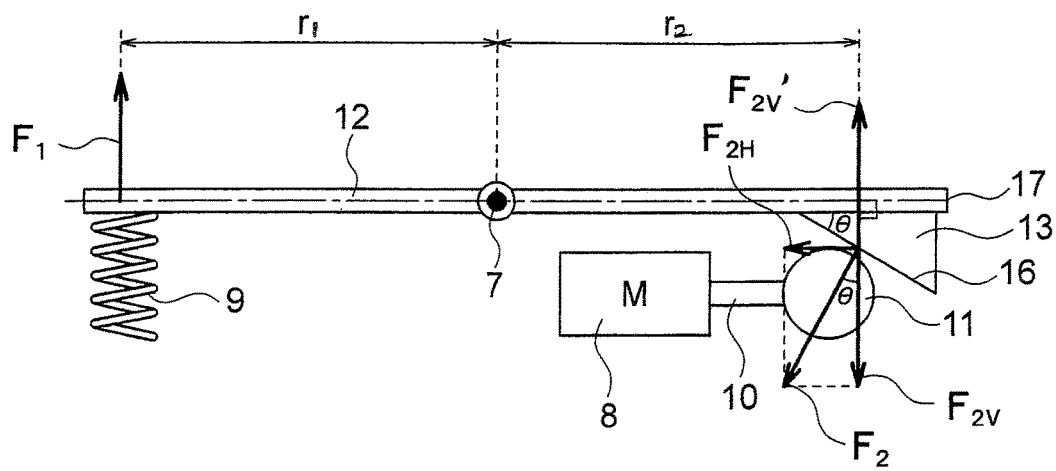
FIG. 3 is a view showing force applied to the board case in FIG. 1.

Next, roles and effects of the slope 16 formed on an end portion of the protruding portion 13 formed on a back surface of the board case 12 in an operation mechanism of the above-mentioned axis adjustment mechanism that is the radiation-direction changing and maintaining means are quantitatively described referring to FIG. 3.

First, a force $F_1$ illustrated in FIG. 3 is a force of the compression spring 9 to push the board case 12. A value of $F_1$ [N] is a spring reaction force determined by a spring constant k [N/mm] and a spring compression amount $\delta$ [mm], as expressed by the following expression.

$$F_1 = k \cdot \delta \qquad \text{(Expression 1)}$$

Further, the spring reaction force $F_1$ is a force that causes the board case 12 to be turned about the turning center portions 7 as the center, as described above. A moment $M_1$ [N·mm] of the spring reaction force $F_1$ is expressed by a product of the force $F_1$ and a distance $r_1$ [mm] from a point of effort at which the force $F_1$ is applied to the board case 12 to the turning center portions 7, as expressed by the following expression.

$$M_1 = F_1 \cdot r_1 \qquad \text{(Expression 2)}$$

On the other hand, as illustrated in FIG. 3, on the side of the board case 12, which is opposite to the side where the compression spring 9 is provided across the turning center portions 7, the columnar body 11 is arranged so as to be in contact with the protruding portion 13 formed on the board case 12. The moment $M_1$ generated by the spring load of the compression spring 9, which causes the board case 12 to be turned, is transmitted to the opposite side of the board case 12 through the turning center portions 7. As a result, a load $F_2$ that causes movement of the columnar body 11 is generated by the protruding portion 13.

The load $F_2$ is generated by the protruding portion 13 for the columnar body 11 in a perpendicular (normal) direction to the slope 16 of the protruding portion 13, as illustrated in FIG. 3. Therefore, the load $F_2$ can be decomposed into a component force $F_{2V}$ in a direction perpendicular to a board surface 17 of the board case 12 and a component force $F_{2H}$ in a direction parallel to the board surface 17.

First, a magnitude of the component force $F_{2V}$ of the load $F_2$, which is in the direction perpendicular to the board surface 17, can be expressed by Expression 3 for a magnitude of the load $F_2$ when an angle formed between the slope 16 of the protruding portion 13 and the board surface 17 is defined as $\theta$ [deg].

$$F_{2V} = F_2 \cdot \cos\theta \qquad \text{(Expression 3)}$$

The component force $F_{2V}$ expressed by Expression 3 is a component of the load applied from the board case 12 to the columnar body 11 having the columnar shape in the direction perpendicular to the board surface 17. As a counteraction to the load $F_{2V}$, a load $F_{2V}'$ for pushing back the board case 12 from the columnar body 11 exists. The load $F_{2V}'$ is a force that causes the board case 12 to be turned in a direction opposite to the direction of the force $F_1$ generated by the spring load of the compression spring 9.

A moment $M_2$ [N·mm] generated by the force $F_{2V}'$ is expressed by a product of the force $F_{2V}'$ and a distance $r_2$ [mm] from a point of effort at which the force $F_{2V}'$ is applied to the board case 12 to the turning center portions 7, as expressed by the following expression.

$$M_2 = F_{2V}' \cdot r_2 \qquad \text{(Expression 4)}$$

Although the moment $M_1$ that causes the board case 12 to be turned by the load $F_1$ generated by the spring reaction force of the compression spring 9 and the moment $M_2$ that causes the board case 12 to be turned by the load $F_{2V}'$ for pushing back the board case 12 from the columnar body 11 act in the opposite directions, the magnitude of the moment $M_1$ and the magnitude of the moment $M_2$ are the same. Therefore, the attitude and the angular direction of the board case 12 can be maintained in a stationary state.

On the other hand, a magnitude of the component force $F_{2H}$ of the load $F_2$ in the direction parallel to the board surface 17 can be expressed by the following expression for the magnitude of the load $F_{2V}$ that increases along with increase in the spring reaction force $F_1$ of the compression spring 9 as described above when the angle formed between the slope 16 formed on the protruding portion 13 and the board surface 17 is defined as $\theta$ [deg].

$$F_{2H} = F_{2V} \cdot \tan\theta \qquad \text{(Expression 5)}$$

Therefore, from Expression (5), the force $F_{2H}$ generated by the spring reaction force of the compression spring 9 is reduced owing to the formation of the slope 16 on the protruding portion 13 of the board case 12, which means that the force $F_{2H}$ is applied to the columnar body 11 after being reduced as an angle of the slope 16 of the protruding portion 13 formed on the board case 12 becomes smaller.

The load $F_{2H}$ expressed by Expression (5) is a load that causes movement of the columnar body 11 in a direction parallel to the board surface 17 by the protruding portion 13 formed on the board case 12. The load is transmitted to the shaft 10 of the stepping motor 8. The load $F_{2H}$ input to the shaft 10 is referred to as "thrust load" (or "axial load") to the motor.

The stepping motor 8 constructs a screw feed mechanism configured to realize a function of converting original turning movement generated by the motor into linear movement. The screw feed mechanism includes a rotor (female thread) and a shaft (male thread).

Thus, when the stepping motor 8 is not driven electrically and hence electromagnets inside the motor are not excited, an electromagnetic force is not generated inside the motor. Thus, the load $F_{2H}$ that is the above-mentioned thrust load is received only by the rotor (female thread) portion inside the stepping motor 8 so as to keep a screw feed amount (shaft length).

If the thrust load is too large, however, there is a fear in that a material of the rotor (female thread) portion creeps to change the screw feed amount (shaft length).

Therefore, it is desired that the thrust load be sufficiently smaller than a thrust load tolerance determined by creep performance of the material inside the stepping motor 8.

In this embodiment, the load $F_{2H}$ input to the shaft 10 by the protruding portion 13 formed on the board case 12 and the slope 16 of the protruding portion 13 is input to the shaft 10 of the stepping motor 8 as the thrust load to the motor as a component decomposed and reduced depending on the angle of the slope 16, as expressed by Expression (5). Therefore, the spring reaction force $F_1$ of the compression spring 9 is reduced by the slope 16 of the board case 12. Even when a compression spring having a large spring modulus is used for a stable attitude of the board case 12, the load actually applied to the stepping motor 8 can be reduced.

Next, how a displacement amount of the shaft 10, which is generated by the stepping motor 8, is converted into an angular change amount of the board case 12 in a case where the stepping motor 8 is electrically driven to excite the internal electromagnets to generate the motor power is quantitatively described.

First, when the shaft 10 of the stepping motor 8 is extended in length, an extension amount is defined as $\delta X_1$. As a result of extension of the shaft 10, the columnar body 11 is displaced toward the slope 16 by $\delta X_1$. With the movement of the columnar body 11, the side of the board case 12 where the protruding portion 13 is formed is pushed up about a contact point of the columnar body 11 on the slope 16 as the point of effort. As a result, the board case 12 causes counterclockwise turning movement about the turning center portions 7 as a center of turning.

Here, the amount of upward displacement of the board case 12 based on the contact point of the columnar body 11 on the slope 16 as a reference is defined as $\delta Y_1$. Then, a relationship between $\delta Y_1$ and $\delta X_1$ is expressed by Expression (6).

$$\delta Y_1 = \delta X_1 \cdot \tan \theta \quad \text{(Expression 6)}$$

As expressed by Expression (6), the amount $\delta Y_1$ of upward displacement of the board case 12 is reduced by the slope 16 of the protruding portion 13 formed on the board case 12 as compared with the extension amount $\delta X_1$ of the shaft 10.

Further, Expression (6) means that the amount $\delta Y_1$ of upward displacement of the board case 12 is reduced as the angle of the slope 16 becomes smaller.

Therefore, the angular change amount $\delta \theta$ of the board case 12, which is obtained through the extension of the shaft 10 by the amount $\delta X_1$, is expressed by Expression (7).

$$\delta \theta = \tan^{-1}(\delta Y_1 / r_2) \quad (7)$$

As expressed by Expression (7), the angular change amount 68 of the board case 12 is determined not by the extension amount $\delta X_1$ of the shaft 10 but by the amount $\delta Y_1$ reduced by the slope 16. Therefore, Expression (7) means that an angular change with resolution higher than the extension amount $\delta X_1$ per step of the shaft 10 included in the stepping motor 8, that is, resolution higher than resolution of the stepping motor 8 is obtained owing to the slope 16.

As described above, in the example of this embodiment, the angle of the board can be driven with the resolution higher than the resolution of the stepping motor 8 owing to the slope 16 of the protruding portion 13 formed on the board case 12.

Next, an in-vehicle radio-wave radar apparatus, which is a reference example of the in-vehicle radio-wave radar apparatus according to this embodiment, is described.

Figure 4:
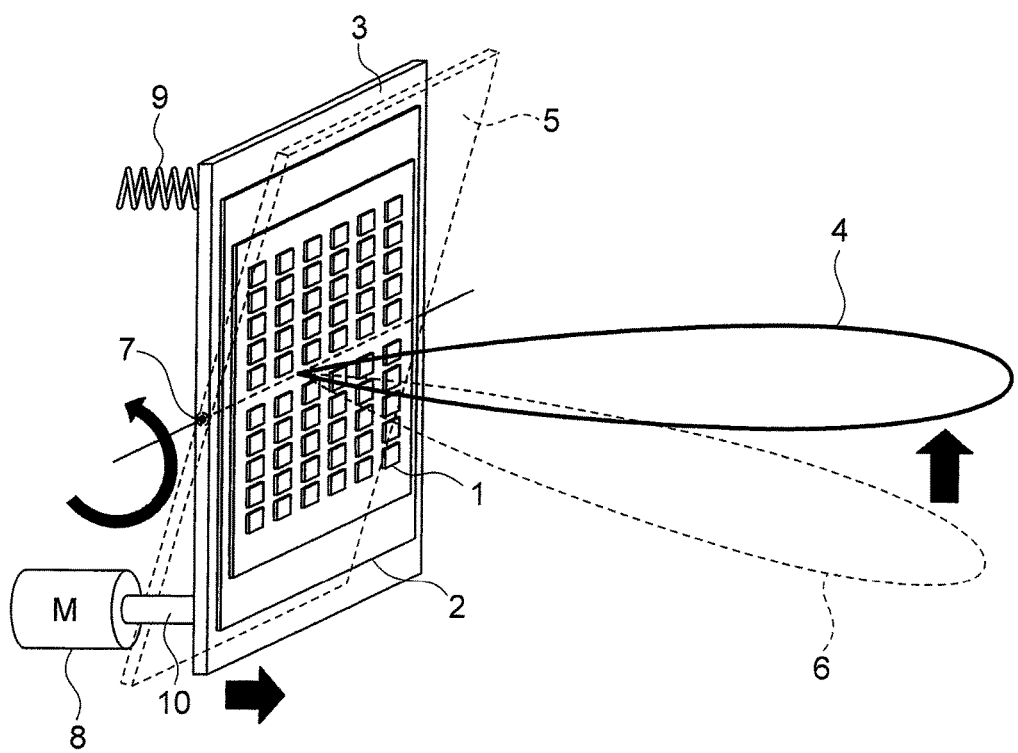
FIG. 4 is a perspective view of a main part of the in-vehicle radio-wave radar apparatus provided as the reference example of the in-vehicle radio-wave radar apparatus illustrated in FIG. 1.
Figure 5:
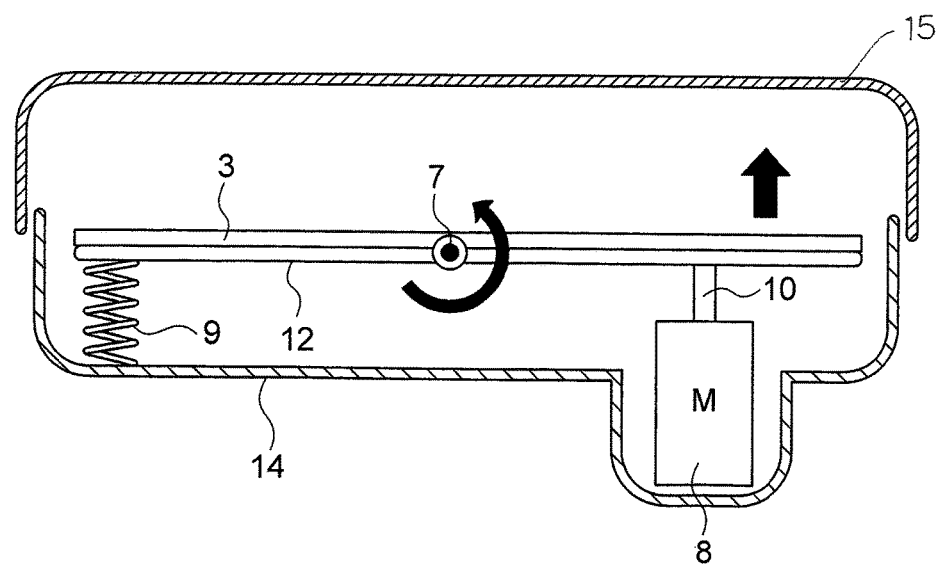
FIG. 5 is a side sectional view of the main part illustrated in FIG. 4.

FIG. 4 is a perspective view of a main part of the in-vehicle radio-wave radar apparatus provided as the reference example, and FIG. 5 is a side sectional view of the main part illustrated in FIG. 4.

In the reference example, the printed board 3 to which the high-frequency antenna board 2 is bonded is accommodated and held in the board case 12. The stepping motor 8 is provided to one end portion of the board case 12, which is on the side opposite to the side where the printed board 3 is bonded. The shaft 10 of the stepping motor 8 extends in a direction perpendicular to the surface of the board case 12, and has a distal end portion fixed to the board case 12. A pair of the compression springs 9 is provided between the board case 12 and the radar apparatus casing 14.

The stepping motor 8 is in a state in which the distal end portion of the shaft 10 thereof is in indirect contact with the printed board 3 through the intermediation of the board case 12 to push the printed board 3. Further, on the opposite side across the turning center portions 7, the compression springs 9 configured to maintain the attitude of the printed board 3 are arranged. With the compression springs 9, the load input to the printed board 3 and the load input to the board case 12 are in equilibrium. Therefore, a stationary state is maintained.

In the reference example, when the stepping motor 8 is actuated to extend the shaft 10, a lower portion of the printed board 3 with respect to the turning center portions 7 is displaced in a radio-wave radiation direction by the load received from the shaft 10. As a result, the attitude of the printed board 3 is angularly displaced upward.

On the other hand, when the stepping motor 8 is actuated in the opposite direction to shorten the shaft 10, the shaft 10 moves away from the printed board 3. Hence, an upper portion of the printed board 3 with respect to the turning center portions 7 is displaced in the radio-wave radiation direction by the load received from the compression springs 9. As a result, the attitude of the printed board 3 is angularly displaced downward.

In the manner described above, the linear movement of the shaft 10 is converted into the turning movement of the printed board 3 about the turning center portions 7 as the center of turning, that is, into change in attitude of the antenna 1.

Therefore, in the axis adjustment mechanism described above, the attitude of the printed board 3 is angularly offset by a necessary amount by the driving of the stepping motor 8. As a result, the axial adjustment on a beam direction of the radio wave radiated from the antenna 1 to a desired beam direction 4 is realized.

In FIG. 4, the desired beam direction 4 of the radio wave is illustrated. Further, the printed board with the axis deviation is illustrated as a printed board 5 in the broken line, and the beam direction of the radio wave with the axis deviation is illustrated as a beam direction 6 of the radio wave in the broken line.

In the above-mentioned in-vehicle radio-wave radar apparatus provided as the reference example, the distal end of the shaft 10 of the stepping motor 8 is brought into contact with a back surface side of the printed board 3 to directly drive the angle of the printed board 3. Therefore, there can be enjoyed an advantage in the realization of the axis adjustment for the radio wave with a simple configuration. However, the above-mentioned in-vehicle radio-wave radar apparatus provided as the reference example has the following problems (A) to (C) because the method of directly driving the angle of the printed board 3 by the stepping motor 8 is employed.

(A) The stepping motor 8 is inevitably arranged perpendicularly to the printed board 3. Thus, the stepping motor 8 is arranged so that a longitudinal direction of the stepping motor 8 is aligned with a thickness direction of the radar casing, which results in increase in casing size.

(B) The angular displacement amount of the printed board 3 is determined based only on a specification (feed amount per step) of the stepping motor 8. Thus, the resolution cannot be increased to be equal to or higher than performance of the stepping motor 8.

(C) The spring reaction force of the compression springs 9 is directly input to the stepping motor 8. Therefore, the load applied to the stepping motor 8 is disadvantageously increased.

On the other hand, in comparison to the apparatus described in Japanese Patent Application Laid-open No. 2000-165130, the in-vehicle radio-wave radar apparatus of this embodiment is effective in the reduced number of components and the simple configuration as in the case of the reference example described above. In addition, as is apparent from the comparison to the reference example described above, the following effects (A1) to (C1) can be obtained.

(A1) The stepping motor 8 can be installed in a direction parallel to the printed board 3. Thus, the product can be reduced in size.

(B1) The angle of the printed board 3 can be driven with resolution higher than the resolution of the stepping motor 8.

(C1) Even when the compression spring 9 having a large spring modulus is used for a stable attitude of the board case 12, the load actually applied to the stepping motor 8 can be reduced.

Embodiment 2

Figure 6:
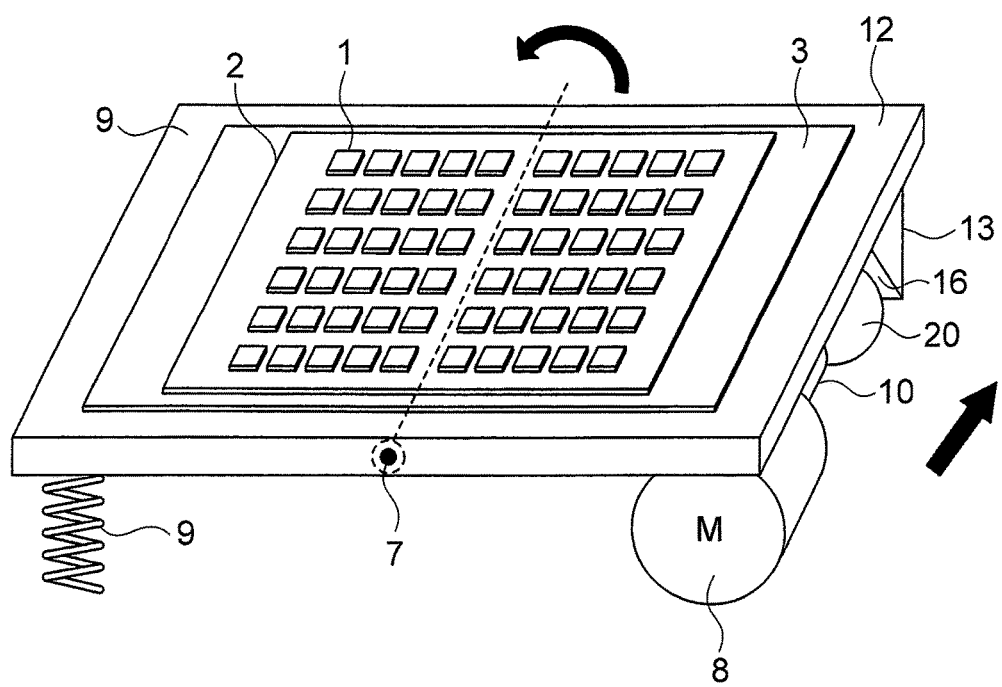
FIG. 6 is a perspective view of a main part of an in-vehicle radio-wave radar apparatus according to Embodiment 2 of the present invention.
Figure 7:
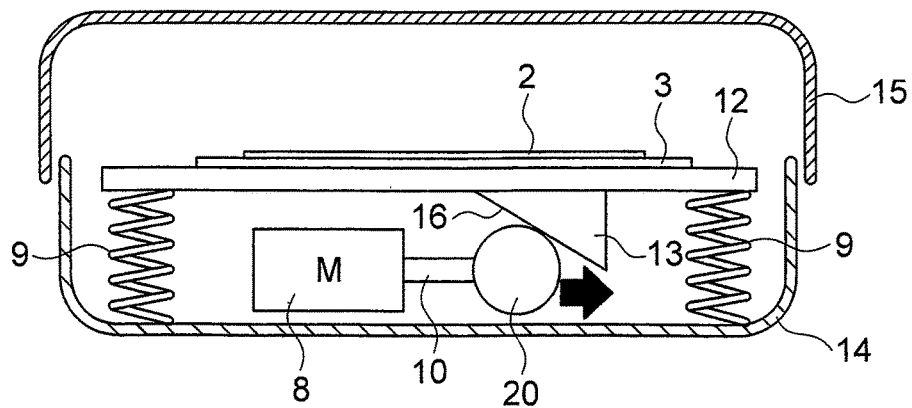
FIG. 7 is a side sectional view of FIG. 6.

FIG. 6 is a perspective view of a main part of an in-vehicle radio-wave radar apparatus according to Embodiment 2 of the present invention, and FIG. 7 is a side sectional view of FIG. 6.

In Embodiment 2, the stepping motor 8 and the shaft 10 thereof are arranged in a direction parallel to the printed board 3 as in the case of Embodiment 1. However, the stepping motor 8 and the shaft 10 are arranged in a direction parallel to the turning axis (indicated by the broken line) between the turning center portions 7.

Further, a spherical body 20, which is a movable portion, is provided to a distal end portion of the shaft 10.

The remaining configuration is the same as that of the in-vehicle radio-wave radar apparatus according to Embodiment 1.

In Embodiment 2, the stepping motor 8 and the shaft 10 thereof are arranged in a direction parallel to the turning axis. Thus, the spherical body 20 is used as the movable portion so that a portion of the columnar body 11, which is in contact with the slope 16, is stable in a radial direction about the turning center portions 7 as the center as in Embodiment 1.

With the use of the spherical body 20, a distance from the turning axis between the turning center portions 7 to a contact point of the spherical body 20 with the slope 16 formed on the surface of the protruding portion 13 formed on the board case 12 is kept constant, which is equivalent to a constant value of $r_2$ expressed in Expression (4).

Therefore, the angular change amount $\delta\theta$ of the board case 12, which is obtained by the extension of the shaft by $\delta X_1$, changes linearly. Thus, a stable angular change can be obtained.

Therefore, in Embodiment 2 of the present invention, the spherical body 20 is adopted so that the stepping motor 8 can be arranged in parallel to the turning axis between the turning center portions 7. As a result, the degree of freedom in component layout in terms of mechanism can be ensured.

Although the in-vehicle radio-wave radar apparatus has been described as the wave energy radiating apparatus in each of the embodiments described above, the present invention is also applicable to, for example, laser radar apparatus configured to detect an obstacle by using a laser beam and sensor apparatus configured to transmit and receive a light beam including visible light, an electromagnetic wave such as a radio wave, and an ultrasonic wave.

What is claimed is:

1. A wave energy radiating apparatus, comprising:
a high-frequency antenna board having a first surface from which wave energy is radiated into a space;
a linear-movement generator that is provided at a second surface of the high-frequency antenna board opposite to the first surface, and is configured to generate power required to change a direction of radiation of the high-frequency antenna board linearly along the high-frequency antenna board;
a direction changer that is provided to face the linear-movement generator, and is configured to change a direction of the power generated by the linear-movement generator toward the high-frequency antenna board, to turn the high-frequency antenna board; and
a force applying member configured to apply a force to the high-frequency antenna board in a direction against the turning of the high-frequency antenna board that is caused by the direction charger,
wherein the linear-movement generator comprises a motor and a shaft configured to move linearly in a reciprocating manner configured via a mechanism configured to convert turning movement of a rotor of the motor into linear movement, the motor and the shaft being positioned in parallel with the second surface of the high-frequency antenna board.

2. The wave energy radiating apparatus according to claim 1, wherein:
the high-frequency antenna board is accommodated in a board case, and has a plurality of antenna elements arranged on the first surface;
the linear-movement generator further comprises a movable portion provided to a distal end portion of the shaft;
the direction changer comprises a direction changing portion that is provided to one end portion of the board case, and is configured to change the direction of the power transmitted via the movable portion through the shaft to a direction for turning the board case about a turning center portion of the board case as a center; and
the force applying member comprises a compression spring provided to another end portion of the board case.

3. The wave energy radiating apparatus according to claim 1, wherein the motor comprises a stepping motor.

4. The wave energy radiating apparatus according to claim 2, wherein the direction changing portion comprises a protruding portion that has a slope and is formed on the board case.

5. The wave energy radiating apparatus according to claim 2, wherein the movable portion comprises a columnar body.

6. The wave energy radiating apparatus according to claim 2, wherein the movable portion comprises a spherical body.

7. An in-vehicle radio-wave radar apparatus comprising the wave energy radiating apparatus according to claim 1.

8. An in-vehicle radio-wave radar apparatus comprising the wave energy radiating apparatus according to claim 2.

* * * * *